United States Patent [19]
Lippke

[11] 3,842,668
[45] Oct. 22, 1974

[54] DEVICE FOR CHECKING MOVING WEBS OF PAPER OR THE LIKE, RELATIVE TO FLAWS

[76] Inventor: Paul Lippke, Walter-Rathenau-Str. 14, 5450 Neuwied, Germany

[22] Filed: Dec. 8, 1971

[21] Appl. No.: 205,891

[30] Foreign Application Priority Data
Dec. 10, 1970 Germany.......................... 2060696

[52] U.S. Cl.................. 73/159, 200/61.13, 308/62
[51] Int. Cl. ........................ B65h 25/14, G01l 5/06
[58] Field of Search ........ 73/159; 200/61.13, 61.18; 340/254; 308/62

[56] References Cited
UNITED STATES PATENTS

| | | | |
|---|---|---|---|
| 2,978,636 | 4/1961 | Fountain........................ | 340/259 X |
| 3,017,061 | 1/1962 | Hobart et al.......................... | 308/62 |
| 3,069,570 | 12/1962 | Abadie.......................... | 200/61.13 X |
| 3,605,617 | 9/1971 | Wieland................................ | 308/62 |

Primary Examiner—Richard C. Queisser
Assistant Examiner—Daniel M. Yasich
Attorney, Agent, or Firm—Walter Becker

[57] ABSTRACT

A device for detecting flaws in a moving web in which one side of the web is supported and opposed to the support are pivotally mounted feeler elements which control contacts in circuit with a signalling device. The feelers are supported on a common beam which is moveable perpendicular to the plane of the web and transversely thereto and which is also tiltable relative to the plane of the web to move the feelers into and out of operative position.

7 Claims, 4 Drawing Figures

DEVICE FOR CHECKING MOVING WEBS OF PAPER OR THE LIKE, RELATIVE TO FLAWS

The present invention relates to a device for checking moving webs of paper, or the like, relative to folds, knots, and similar flaws, according to which a plurality of feelers are provided which are located closely adjacent to each other in a row and which are rotatable about an axis which is located in a plane transverse to the direction of movement of the respective web and parallel to the plane of the web, said feelers being adapted to release an electric contact and being connected to a common traverse or beam connected to the machine frame while being arranged opposite to a guiding roller, or the like, for the web. A device of this type is known and described, for instance, in German Utility Model No. 6,605,887.

With the said heretofore known device, each feeler has associated therewith a separate adjusting device by means of which a feeler can be moved to a predetermined distance from the surface of the web to be checked. Customarily, such feelers have a width of approximately ten centimeters. With web width of 2 meters and more, therefore a corresponding number of feelers is necessary in order completely to check the entire width of the web. In case the thickness of the webs to be checked varies, a considerable time is necessary in order to set all adjusting means of all feelers in such a way that the feelers will have the same or a different predetermined distance from the web surface.

In view of the fact that particularly in connection with the manufacture of paper, the thickness of such webs varies frequently, the drawback of the considerable time consumption for setting the feelers is all the worse. The setting or adjusting operations required by this heretofore known device considerably interfere with the operation.

While with heretofore known devices of the type involved, the feelers are so rotatably mounted that in case of tears in the webs or in case of other operational defects they can evade or be moved out of the way, the insertion of the start of a new web is difficult because it is necessary to pass the web between the only slightly moved out feelers and the guiding roller for the web. In this connection there exists the danger that the feelers are damaged and will not be able to meet their intended function in a proper way.

It is, therefore, an object of the present invention to provide a device of the above mentioned general type which will overcome the drawbacks outlined above.

This object and other objects and advantages of the invention will appear more clearly from the following specification, in connection with the accompanying drawings, in which:

FIG. 1 diagrammatically illustrates a front view of a device according to the invention.

Figure 1:
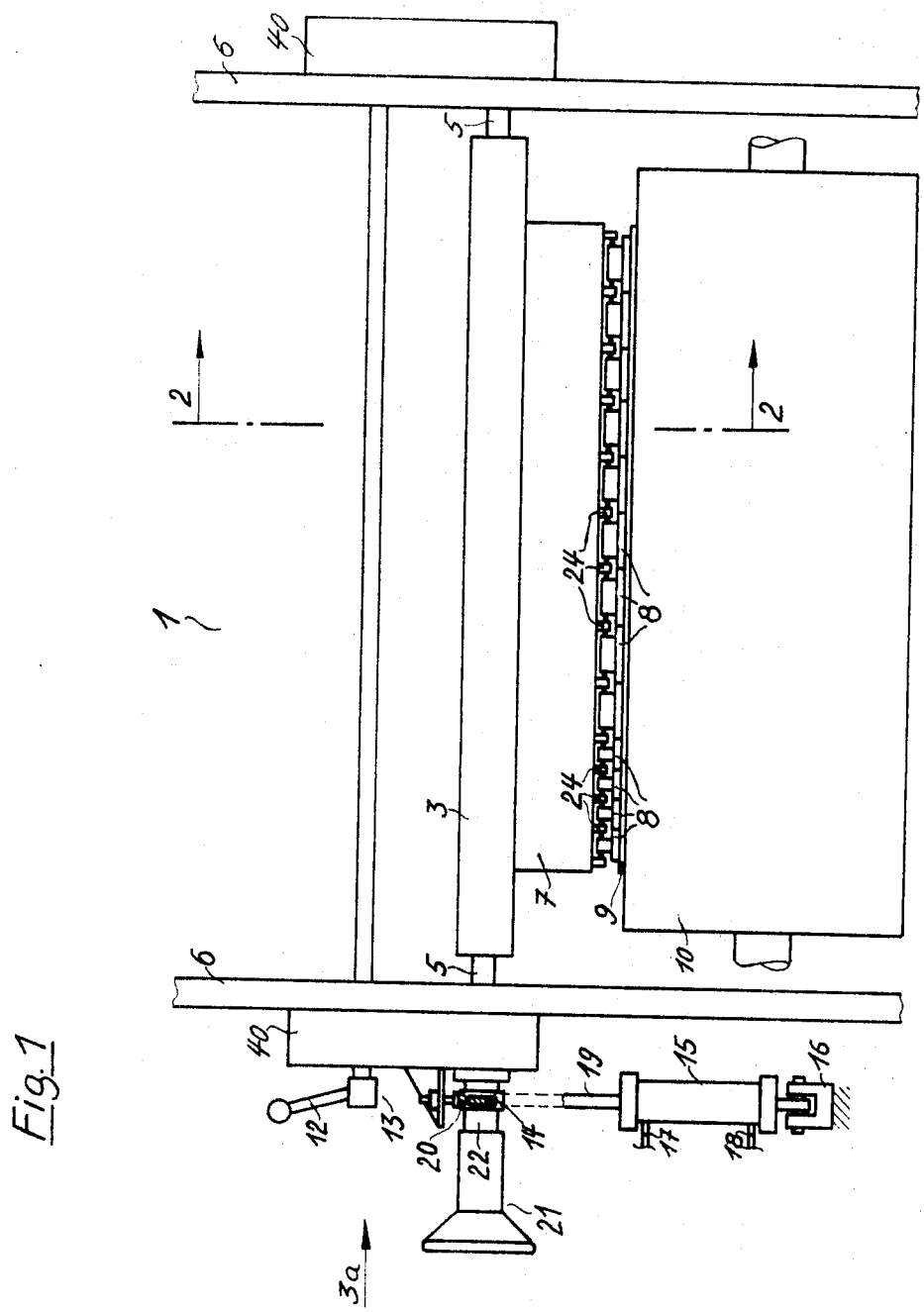

The device according to the invention is characterized primarily in that the feelers 8 are rotatably journaled directly on the traverse 3, which latter is rotatably journaled in bearing means on the machine frame, which bearing means are displaceably guided in a direction perpendicularly with regard to the plane of the web.

The device according to the invention is furthermore characterized in that means engaging said bearings are provided for displacing the bearings while means engaging the traverse are provided for pivoting said traverse. These means have associated therewith means arranged on the machine frame for arresting the traverse at least in checking position of the feelers.

In this way it will be possible by a uniform displacement of the two bearings for the traverse, simultaneously to adjust all feelers to a predetermined extent and to the same extent relative to the plane of the web to be checked. Such an adjustment may be carried out in a relatively short time. The device according to the present invention is therefore quickly adaptable to different thicknesses of webs to be checked. Moreover, for purposes of easily inserting the start of a new web, the entire traverse with the feelers can be shifted out of the way by the guiding roller in such a way that the insertion of the web will be possible in a minimum of time and without the feelers risking the danger of being damaged. Also, in case of an occasional web tear off, all feelers can immediately be shifted away from the guiding roller. This is very important, inasmuch as with web tear offs otherwise the danger would exist that the web material accumulates in front of the feelers whereby the latter may be damaged. This danger is particularly great with web speeds of 300 meters per minute as they occur in the paper manufacturing art.

A preferred embodiment of the present invention is characterized in that as bearing means for the traverse, there are employed bearing bushings which are rotatably journaled on the machine frame and in which butt shafts of the travers are rotatably journaled, which butt shafts are eccentrically arranged with regard to the axis of the bearing bushings. Furthermore, means are provided for turning the bearing bushings, and means arranged on the machine frame for securing the bearing bushings against unintentional rotation. This design thus provides the possibility, easily realized, for adjusting the feelers in the direction perpendicular to the plane of the web.

In order to permit an as complete as possible check of the web over its entire width, it is suggested according to a further feature of the invention that the extension in width of a plurality of feelers arranged at least at one end of the row in considerably less than that of the remaining feelers of the row, for instance, only half the extension in width of the feelers. Furthermore, according to which suggestion, the traverse is displaceably arranged in bearings for movement in the axial direction of the butt shafts. According to a still further feature of the invention, at least the feelers arranged at one end are adapted to be arrested in a position facing away from the plane of the web. In this way, the feelers when located in testing position will nearly completely cover the entire width of the web. Within the range of the edges of the web, the web is not checked because at this area, due to particularities in the manufacturing process, frequently flaws occur whic are not to be registered or checked because these marginal strips of the web are anyhow cut off in a succeeding operation.

For purposes of displacing the traverse in the axial direction of the butt shafts, it is suggested that the butt shafts are axially displaceably journaled in further bushings arranged concentrically and rotatably in the bearing bushings while the butt shafts are non-rotatably connected to the bushings. It is furthermore suggested that a threaded sleeve rotatable at the end of a butt shaft and axially displaceably mounted is drivingly connected to a threaded extension of the bushing. By turning the threaded sleeve it is possible to move the traverse with the feelers into the desired position with regard to the location of the web.

According to a further feature of the invention, for purposes of shifting the traverse there is provided a pivot arm which at one end is fixedly connected to a butt shaft while the other end of the pivot arm is engaged by a compressed air cylinder piston system adapted to press the pivot arm, at least in checking position of the feelers, against an abutment. The position of the abutment with regard to the pivot arm is determined by the location of the feelers in checking position of the device. By shifting over a control valve for the compressed air cylinder, the latter will move the pivot arm to such an extent that the traverse together with the feelers will be sufficiently pivoted out of the range of movement of the web to be checked.

Figure 4:
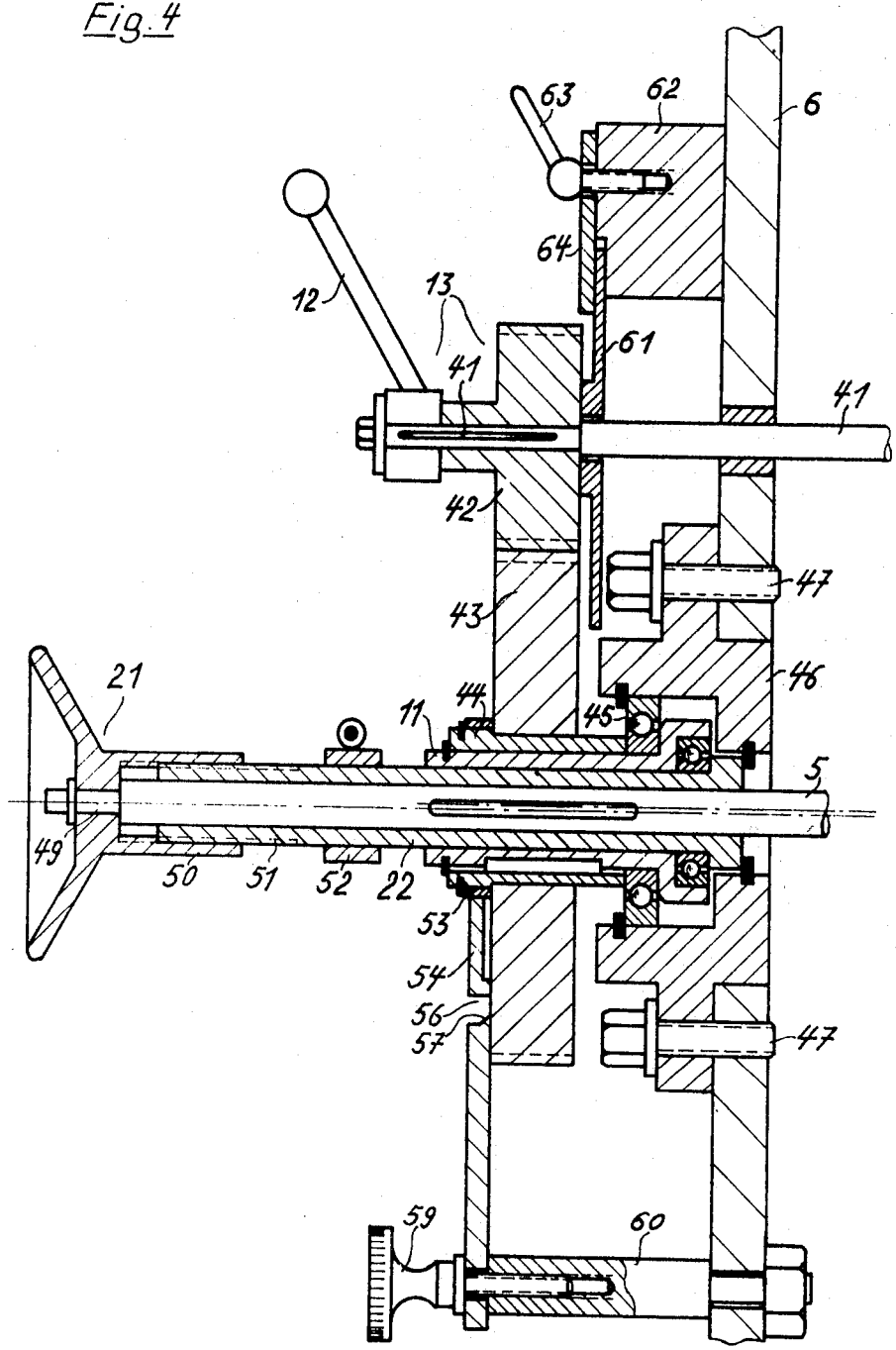
FIG. 4 shows the device according to FIG. 3 in a section taken along the line IV—IV of FIG. 3.

Referring now to the drawings in detail, the device 1 according to the invention comprises primarily a traverse or beam 3 which by means of butt shafts 5 is rotatably journaled in a machine frame 6. Connected to the traverse 3 is a bearing plate 7 which has on that side thereof that faces away from the traverse, feelers 8 rotatably journaled. The feelers 8 are so adjusted that they are floatingly arranged at a predetermined distance over a web 9 to be checked. The web 9 is passed over a guiding roller 10. Instead of the guiding roller, it is, of course, also possible to employ a guiding strip. The butt shafts 5 of the traverse 3 are journaled in bearing bushings 11 suitably held relative to frame 6 (FIG. 4). By actuating means 12 it is possible to actuate an adjusting device 13 or first means which makes possible a displacement of the butt shafts 5 journaled in the bearing bushings 11, in a direction perpendicular to the plane of the web 9.

Connected to one butt shaft 5 is a pivotal arm 14 whiich is drivingly connected to a compressed air cylinder piston system 15. The cylinder piston system 15 rests on a stationary bearing 16. The cylinder piston system 15 may, for instance, comprise a double acting cylinder piston system with connections 17 and 18. When in checking position, the web 9 presses the piston rod 19 of the cylinder piston system 15, the pivot arm 14 rests against an adjustable abutment 20 which is connected to a machine frame 6. Furthermore, at this end of the butt shaft 5 there is rotatably mounted an adjusting device 21 or second means which is axially immovable itself and which is drivingly connected to a bushing 22 so that an axial displacement of the butt shaft 5 relative to the bushing 22 is permitted upon actuation of the adjusting device.

Figure 2:
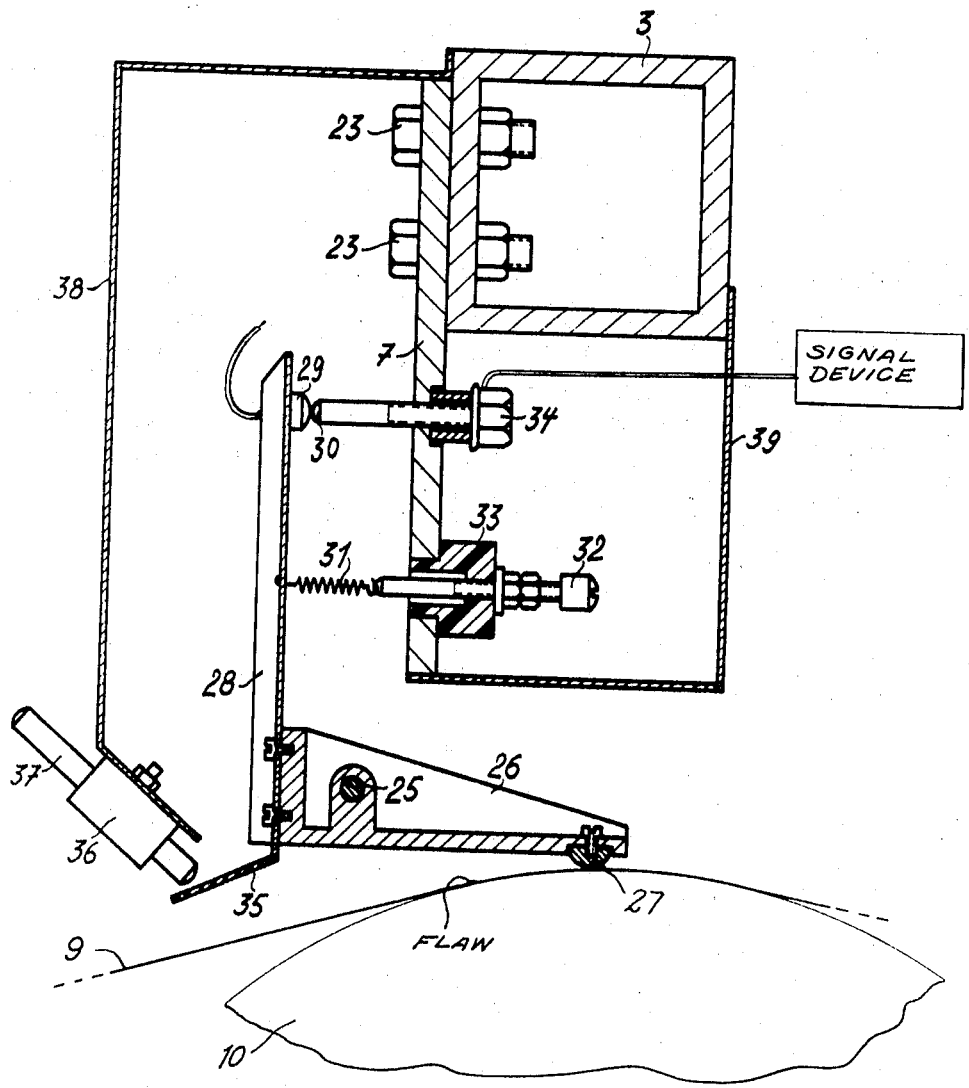
FIG. 2 is a side view in partial section of a device according to the invention, said section being taken along the line II—II of FIG. 1, however, at a greater scale than that of FIG. 1.

FIG. 2 shows the journaling of the feelers on the traverse in greater details. On traverse 3 which is preferably formed by a hollow profile with rectangular or square circumferential line, there is a bearing plate 7 connected by means of screw bolts 23. Shafts 25, to which feelers levers 26 of angular cross section are firmly connected and rotatably arranged in bearings 24 (FIG. 1). At one end of one leg of the feeler levers 26 there is provided a feeler strip 27 sufficiently spaced from shaft 25 in conformity with the checking problem. The feeler strips 27 are connected to the respective legs of the feeler lever 26, for instance, by screws, and extend parallel to the plane of the web and perpendicularly with regard to the direction of movement thereof over the total width of a range of web 9, which range is to be checked by a single feeler 8. To the other leg of each feeler lever 26 there is connected a contact arm 28, for instance, by means of screws. On the contact arm 28 at that end which faces away from the connecting area there is provided a contact 29 which engages a stationary contact 30 in a checking position of the feeler 8. The contacts 29, 30 are under the influence of a force which originates with a spring 31. The spring 31 is, on one hand connected to the contact arm 28, and on the other hand to a setting screw 32. The setting screw 32 by means of a ring 33 of electrically insulating material rests on the bearing plate 7 so that the setting screw 32 has no electrical connection to the bearing plate 7. The contact 30 is electrically connected by means of a screw 34 adjustable in the bearing plate 7 that is connected to said screw. From the contact arm 28 into screw 34 electrical conductor means lead to a known signaling device. This signaling device will give off a signal whenever thickened portions, folds, or similar flaws actuate one of the feelers 8 by means of the feeler strip 27 which is floatingly held over the web 9, so that the contacts 29, 30 are separated.

The contact arm has that end thereof which faces away from the contact 29 provided with an extension 35 which is arranged within the region of an arresting device 36. In the arresting device 36 there is provided to a pin 37 which is displaceable in longitudinal direction relative to the device 36 and which by successive manual actuation is alternately arrestable in two different positions. In one position, the pin 37 has no contact with the extension 35, whereas in the other position, the pin has pivoted the extension 35 about shaft 25 and against the thrust of spring 31 to such an extent that the respective feeler 8 is pivoted sufficiently far out of its checking position. This is expedient when feeler 8 is located above a side edge of the web to be checked and thus would otherwise be continuously actuated by the undetermined shape of the web at this area. The arresting device 36 is connected to a protective hood 38, which in its turn, is connected to the bearing plate 7 or to the traverse. A further protective hood 39 is connected to the other side of the traverse 3 in order to protect the feelers, and in particular the contacts, as far as possible, against outer influence, especially the deposit of dust.

Figure 3:
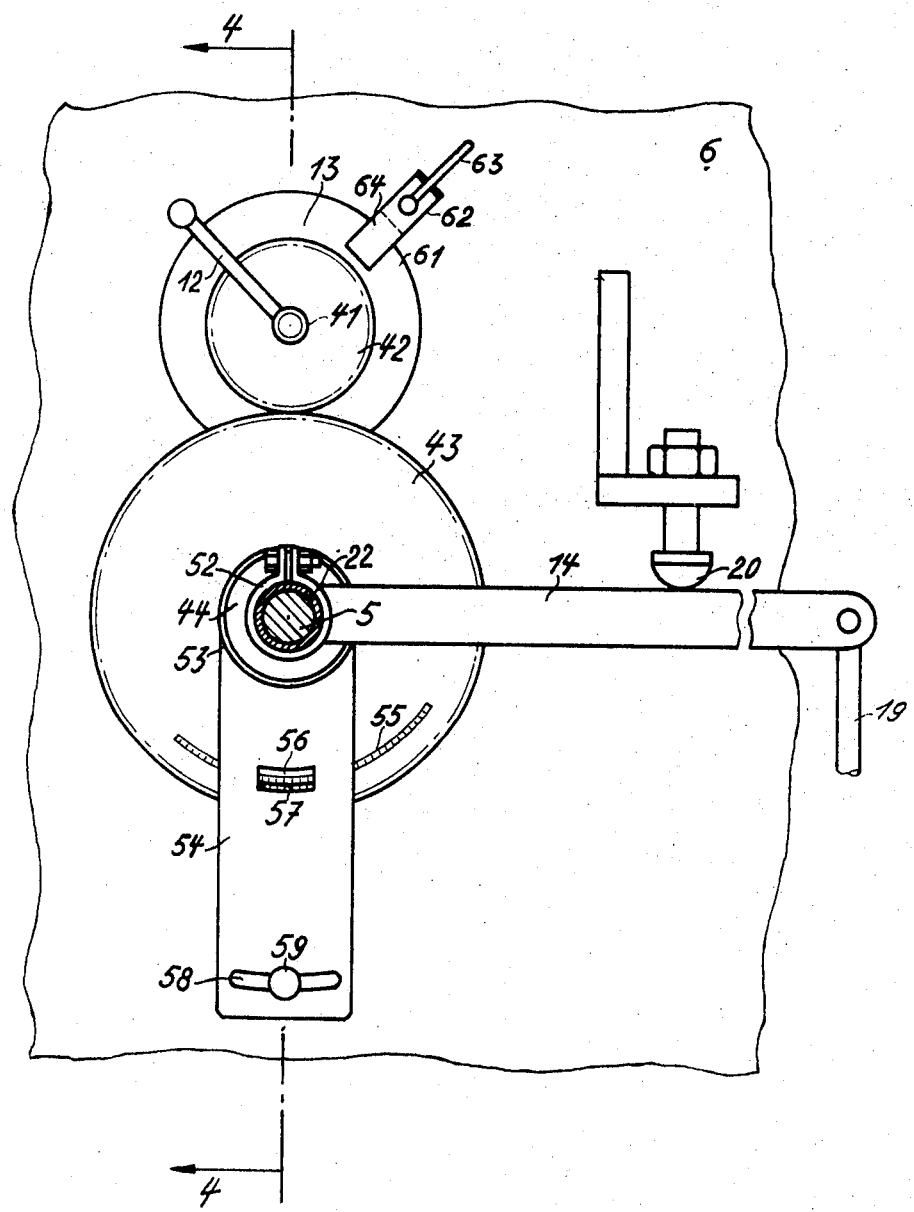
FIG. 3 is a side view of the device as seen in the direction of the arrow 3a of FIG. 1.

FIG. 3 shows the adjusting device 13 or first means with the protective hood 40 (FIG. 1) removed. The actuating means 12 of the adjusting device 13 or first means is fixedly connected to a shaft 41 which, in its turn, is rotatably journaled in the machine frame 6. Fixedly mounted on shaft 41 is a gear wheel 42 which in turn is drivingly connected to a mesh with a gear 43. Gear 43 is fixedly connected to a bushing 44 which in turn is fixedly connected to the bearing bushing 11 (FIG. 4). The bearing bushing 11 through the intervention of a ball bearing 45 rests on the bearing flange 46. The bearing flange 46 is connected by means of screw bolts 47 to the machine frame 6.

The bushing 22 is rotatably journaled in the bearing bushing 11. The journaling of the bushing 22 in the bearing bushing 11 is so eccentric that the axes of the bushing 11 or bushing 22 which are parallel to each other are spaced from each other, for instance, by one millimeter. Fixedly connected to the bushing 22 and journaled to be displaceable in axial direction therein is a butt shaft 5. The adjusting device 21 or second means is rotatable and axially fixed or held against displacement as mounted on a section 49 of the butt shaft 5. The adjusting device 21 has a threaded sleeve 50 which is drivingly connected to an extension 51 of bushing 22, said extension 51 being provided with a thread. Furthermore, a clamping ring 52 is fixedly connected to the bushing 22 and has rigidly connected thereto a pivot arm 14 as best shown in FIG. 3. Rotatably journaled on bushing 44 is a ring 53 having an arm 54 connected thereto. Within the range of a scale 55 on gear 43, the arm 54 has a cutout 56. In the region of this cutout 56 there is provided a web-shaped extension 57 which, in addition to a reading mark for the scale 55, has a vernier or nonium for a precise reading of the respectively set scale length. That end of arm 54 which faces away from the ring 53 is provided with an oblong hole 58 which extends along a circular arc about the bearing bushing 11. The oblong hole 58 permits an adjustment of the arm 54 in a region determined by the length of the oblong hole. This device serves for permitting the setting of the reading mark for scale 55, which reading mark is provided on the extension 57, in a position precisely opposite to the start of the scale. By means of a set screw 59 which is adapted to be screwed into a bearing block 60 connected to the machine frame 6, it is possible to arrest the arm 54 in any desired position.

Fixedly connected to the gear 42 is a clamping disc 61 which is arranged within the region of a bearing block 62. By means of an actuating handle, or the like 63, the clamping disc 61 can, by means of a clamping plate 64, be arrested relative to the bearing block 62 whereby also the bearing bushing 11 will, in its respective position, be secured against accidental turning.

When turning the gear 42 by means of the handle, or the like 12, the bearing bushing 11 will be rotated relative to the gear 43. In conformity with the respective turning of the bearing bushing 11, the bushing 22 with its butt shaft 5 moves into a position which is, more or less, spaced from the web 9. This means that the axis of the butt shaft 5 moves along a circular arc determined by the eccentric mounting in the bearing bushing 11. The pivot lever 14 engaging the bushing 22, which lever 14, in view of the action exerted by the compressed air cylinder piston system 15, rests against the abutment 20, prevents a turning of the butt shaft 5. While during the dual function adjustment in effect by third means, theoretically slight pivot movements of the pivot lever 14 occur during operation of first adjusting means; which result in a corresponding pivoting of the traverse, the extent of such pivot movements are negligibly small because the length of the pivot arm 14 and the location of the abutment 20 on the frame 6 above arm 14 in FIG. 3 are so selected that the feelers 8 are practically with each setting of the traverse located at the same point above the web. Thus, in effect, the third means are connected to the traverse or beam for rotation thereof about the axis of the bearings; cooperating elements of abutment means are operatively connected to the beam and to the frame to stop the beam in the checking position of the feelers.

On the other side of the machine frame 6 there are provided the gears, the butt shaft 5, and the shaft 41, which in FIG. 4 are shown for one side. Additionally, on the other side of the machine frame 6 there is provided a non-illustrated device for bracing the gears relative to each other in order to compensate for gear play. This is intended to bring about that during the actuation of the adjusting device 13 by the handle 12 from one side of the machine frame 6, the traverse 3 will actually uniformly be moved at both ends.

a. The recited first means serve for exact adjustment of the feeler relative to the web or path being tested; this means for adjusting a predetermined spacing of the feeler strips 27 relative to the path or web 9.

b. The recited second means serve for adjustment of the feelers transverse to the direction of movement of the path or web. Herewith there is to be achieved that the entire width of the path or web to be tested by feelers respectively, feeler strips, becomes grasped as far as to the edge strips of the path or web not being tested.

c. The recited third means serve the high respectively pivoting way of the traverse with the feelers in order either in the case of a web tear-off to hinder destruction or damaging of the feelers or in the case of new introduction of a path or web to facilitate the actuation thereof.

It is, of course, to be understood that the present invention is, by no means, limited to the particular showing in the drawings, but also comprises any modifications within the scope of the appended claims.

What is claimed is:

1. A device for checking of a web of paper, or the like, to detect the presence of flaws therein and comprising: a machine frame, guide means in the frame to engage a web being checked on one side to guide the web in a predetermined plane, and checking means in the frame on the other side of web in opposed relation to said guide means, said checking means comprising a beam parallel to said plane and extending transversely to the direction of travel of said web, a plurality of adjustable feelers rotatably journalled to said beam having two opposite ends connected to shaft means which are rotatably journalled in said machine frame in side by side relation on an axis parallel to the beam and having feeler elements thereon to engage the web being checked, a pair of contact means electrically connected to signal means and biased normally closed under the control of said feelers whereby movement of a feeler upon engagement of a flaw in the web by the feeler element on the respective feeler will release said contact means to signal the presence of flaws, bearings in the frame rotatably supporting the ends of the beam in the frame, first means for adjusting said bearings in the frame in a direction perpendicular to said plane, second means for adjusting said bearings in said frame in the direction of the length of said plane, third means connected to said beam for rotation thereof about the axis of said bearings, and cooperating elements of abutment means operatively connected to said beam and to said frame to stop said beam in the checking position of said feelers.

2. A device according to claim 1 in which said first means comprises eccentric bushings interposed between said bearings and said frame, further actuating means for rotating the bushings in the frame, and means for clamping the bushings in adjusted position in the frame.

3. A device according to claim 1 in which said feelers at one end of said beam are more closely spaced than at the other end thereof, and means for supporting at least the feelers near one end of the beam in feeling position in the absence of a web therebeneath.

4. A device according to claim 1 in which said beam has shaft elements on the opposite ends extending through said bearings, said second means comprising a sleeve itself fixed but reciprocably receiving each shaft and each sleeve being moveably mounted in said frame except as to axial movement being precluded, and nut means rotatably but nonaxially moveably connected to each shaft element and threadedly engaging the respective sleeve.

5. A device according to claim 4 in which said first means includes an eccentric bushing interposed between each sleeve and said frame, means for angularly adjusting said eccentric bushing, and means for clamping the eccentric bushings in adjusted positions.

6. A device according to claim 5 in which said third means comprises an arm fixed to at least one of said shafts, and fluid motor means connected to said arm to rotate the shaft and beam.

7. A device according to claim 1 in which shaft elements pass through said beam and on the opposite ends thereof extending through said bearings, said third means comprising an arm fixed to at least one of said shafts, and fluid motor means connected to said arm to rotate the shaft and beam.

* * * * *